United States Patent [19]

Loukes et al.

[11] 3,902,882

[45] Sept. 2, 1975

[54] ELECTRICALLY MODIFIED FLOAT GLASS MANUFACTURING METHODS

[75] Inventors: David Gordon Loukes, Prescot; Kenneth Edward Whitelock, Liverpool, both of England

[73] Assignee: Pilkington Brothers Limited, Liverpool, England

[22] Filed: May 23, 1973

[21] Appl. No.: 363,100

[30] Foreign Application Priority Data
June 5, 1972  United Kingdom............... 26183/72

[52] U.S. Cl..................................... 65/30; 65/99 A
[51] Int. Cl.².................. C03C 21/00; C03B 18/02
[58] Field of Search............................... 65/30, 99 A

[56] References Cited
UNITED STATES PATENTS

| | | | |
|---|---|---|---|
| 3,467,508 | 9/1969 | Loukes et al. | 65/30 |
| 3,544,437 | 12/1970 | Loukes et al. | 65/30 X |
| 3,622,295 | 11/1971 | Loukes et al. | 65/30 |

*Primary Examiner*—S. Leon Bashore
*Assistant Examiner*—Kenneth M. Schor
*Attorney, Agent, or Firm*—Burns, Doane, Swecker & Mathis

[57] ABSTRACT

A metallic dispersion of predetermined intensity is developed in a glass surface by introducing a concentration of metal ions into the glass surface while the glass is at a temperature at which it can be modified, and contacting that surface with a molten metal body which is reducing with respect to the metal ions, the time of contact being determined to produce the metallic dispersion of predetermined intensity. The metal ions are introduced into the glass surface by establishing an anode electric flux density from a first molten metal body into the glass surface. Then the metal ions are reduced by establishing a cathodic electric flux density from the glass surface into the molten metal which is reducing with respect to the metal ions. It is critical that there be sufficient alkali-metal ions in the glass surface to provide the cathodic electric flux density from the glass surface without sufficient migration of the reducable metal ions from the glass.

12 Claims, 2 Drawing Figures

ELECTRICALLY MODIFIED FLOAT GLASS MANUFACTURING METHODS

BACKGROUND OF THE INVENTION

1. Field of the Invention

This invention relates to glass manufacturing methods and more particularly to methods in which a continuous metallic dispersion of predetermined intensity is developed in the surface of the glass.

The production of a continuous metallic dispersion in a glass surface, particularly flat glass results in enhancement of solar radiation reflection and absorption by the glass thereby reducing the direct transmission of solar radiation through the glass, high visible light reflection, an element of privacy for occupants of a building embodying the glass and enhanced aesthetic appeal.

The production of glass of this kind is becoming increasingly important for use in buildings and it is desirable that glass with good solar radiation reflection and absorption characteristics should at the same time permit adequate light transmission.

2. Description of the Prior Art

Flat glass with a concentration of metal embodied in a surface of the glass has been produced by the float process in which flat glass in ribbon form is advanced along the surface of an elongated molten metal bath and a segregated body of molten metal, either a pure metal or a metal alloy, has been confined against the upper surface of the ribbon. The surface constitution of the glass has then been modified by passing an electric current through the glass between the molten metal body and the bath.

When operating this method with certain molten alloy bodies, for example copper/lead alloy, regulation of operating conditions has permitted control of the relative proportions of the two elements of the alloy which migrate into the glass surface and become reduced in the glass surface to metallic form by the subsequent exposure of the modified glass surface to the protective atmosphere which is maintained over the bath and which usually has reducing characteristics. A typical atmosphere consists for example of 90% nitrogen and 10 % hydrogen.

Many other alloys have been employed, for example silver/bismuth alloys, nickel/bismuth alloys, copper/bismuth alloys and nickel/tin alloys.

In carrying out this process two molten alloy pools have been proposed for carrying out a two-stage treatment of the glass. A reducing agent, for example arsenic, may be introduced into the top surface of the float ribbon from the first pool, and copper ions which migrate into the glass from the second pool are reduced by the arsenic already present in the glass to give the glass a red colour. This way of operating does not rely on having a reducing atmosphere over the bath and the atmosphere may for example consist of nitrogen only.

It has also been proposed that the first pool be connected as an anode while the second pool is connected as a cathode so that an element, for example lithium or zinc, migrates into the upper surface of the glass from the first pool and the same element migrates into the lower surface of the glass from the bath, being maintained in a predetermined concentration in the bath. This produces symmetrical treatments of the glass surfaces. Lithium-rich glass surfaces can be subsequently employed in a chemical toughening process and zinc in both surfaces improves the weathering properties of the glass.

In another way of effecting the surface modification of float glass the molten metal bodies are located against the upper surface of the glass and each of the bodies clings to a locating member extending across the bath. These locating members which usually act as electrodes are spaced apart along the surface of the glass by a distance sufficient to ensure passage of electric current from the upstream member, connected as an anode, through the thickness of the glass, then through the molten metal of the bath and up through the thickness of the glass to the second member which is connected as a cathode. The same current flow effects migration of metal ions from the first clinging body into the upper surface of the glass and from the bath itself into the undersurface of the glass.

It has also been proposed to move the two locating electrodes sufficiently close together, without the molten bodies touching, to ensure that current passes through the glass only and in this arrangement there was only migration from the first clinging body into the glass and the undersurface of the glass remained relatively unaffected.

It has now been discovered that by employing two pools of molten metal on the glass surface and independently regulating the current flowing from the first pool connected as an anode into the glass and the current flowing from the glass into the second pool, connected as a cathode, the electrical action at the second pool can be employed to effect cathodic reduction of metal ions which had migrated into the glass surface from the first pool.

It has also been discovered that the spacing between the two pools has an effect on the optical properties of the glass produced, as has the atmosphere to which the glass is exposed between the anodic molten metal pool and the cathodic molten metal pool.

It is a main object of the present invention to employ these discoveries in a process for the production of flat glass with enhanced solar radiation reflection and absorption characteristics.

It is a further object of the invention to provide surface modified glass having enhanced solar heat rejection characteristics with adequate visible light transmission.

SUMMARY

The invention provides a glass manufacturing method in which a metallic dispersion of predetermined intensity is developed in a surface glass which is at a temperature at which the glass is susceptible to surface modification. A predetermined concentration of metal in ionic form is introduced into the glass surface, and that ion-rich surface is contacted with a molten metal body which is sufficiently reducing with respect to said metal ions introduced into the glass to cause during the time of contact reduction of sufficient of the metal ions to produce said metallic dispersion of predetermined intensity.

The concentration of metal in ionic form may be introduced into the glass surface as a constituent of the batch material from which glass is produced. Preferably the concentration of metal ions is introduced by an electrolytic method in which an electric flux density established from anodic molten metal body into the glass causes migration of metal ions into the glass surface, and then the glass is contacted with a second molten metal body to effect the reduction. The electric flux density defines the coulombic treatment of the glass surface and is measured in coulombs per square meter ($C/m^2$). The second molten metal body may be cathodic with respect to the glass to promote cathodic reduction of sufficient of said metal ions to produce the required metallic dispersion in the glass.

The independent regulation of the electrical supplies to the first and second bodies permits regulation to produce a desired product within close limits. At present the most acceptable solar heat rejection glass is produced by introducing copper and lead into the glass surface in controlled proportions. Both molten metal bodies may be of copper/bismuth alloy to introduce copper into the glass, or may be of lead to introduce lead into the glass.

As well as the individual regulation of the electrical supplies the spacing between the two molten metal bodies is important. Usually the glass is soda-lime-silica glass advancing in ribbon form along a bath of molten metal, and the time of exposure of the glass surface between the molten metal bodies is set to provide, at the end of that time, sufficient sodium ions in the glass surface to carry the required cathodic current without a significant migration of said metal ions from the glass into the second molten metal body.

DESCRIPTION OF THE PREFERRED EMBODIMENTS

Figure 1:
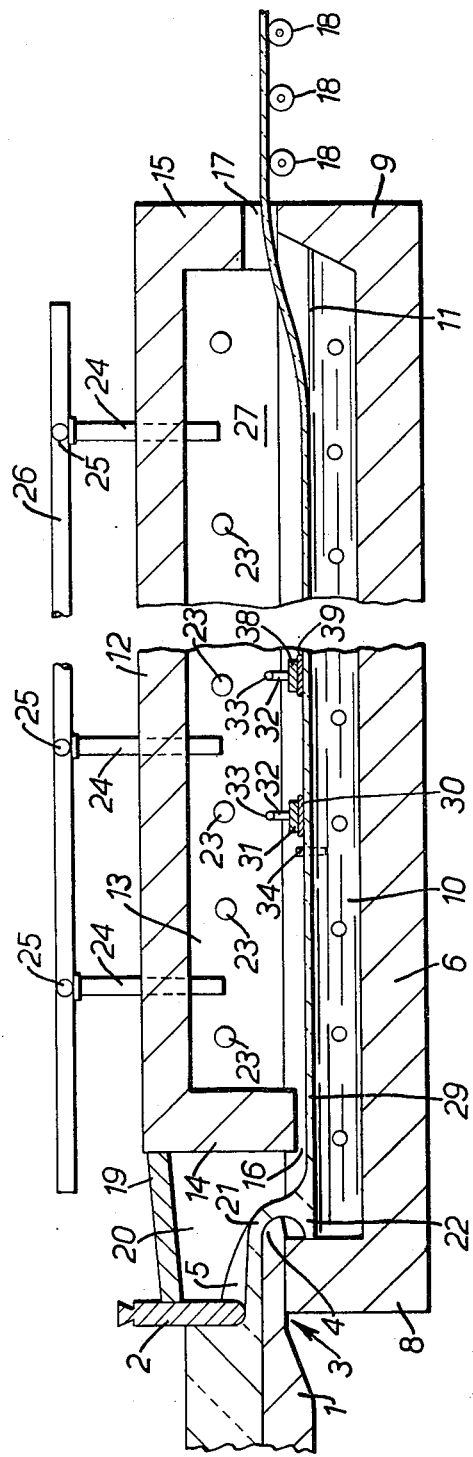
FIG. 1 is a sectional elevational through an elongated tank structure along which a ribbon of glass is being advanced in the float process, and showing two pools of molten metal located on the upper surface of the ribbon.

Referring to FIG. 1 of the drawings a forehearth of a continuous glass melting furnace is indicated at 1 and a regulating tweel at 2. The forehearth ends in a spout 3 comprising a lip 4 and side jambs 5, one of which is shown in FIG. 1. The lip 4 and side jambs 5 constitute a spout of generally rectangular cross-section.

The spout is disposed above the floor 6 of an elongated tank structure including side walls 7 joined together to form an integral structure with the floor 6, an end wall 8 at the inlet end of the tank and an end wall 9 at the outlet end of the tank. The tank structure holds a bath of molten metal 10 which is usually molten tin or may be of a molten tin alloy in which tin predominates and which has a specific gravity greater than that of the glass. The surface level of the bath is indicated at 11.

A roof structure is supported over the tank structure and the roof structure includes a roof 12, side walls 13 and integral end walls 14 and 15 respectively at the inlet and outlet ends of the bath. The inlet end wall 14 extends downwardly close to the surface 11 of the molten metal bath to define with that surface an inlet 16 which is restricted in height and through which molten glass is advanced as will be described below.

The outlet end wall 15 of the roof structure defines with the outlet end wall 9 of the tank structure, an outlet 17 through which the ultimate ribbon of float glass produced is discharged on to driven conveyor rollers 18 mounted outside the outlet end of the tank structure and disposed somewhat above the level of the top of the end wall 9 so that the ribbon is lifted clear of the wall 9 for discharge through the outlet 17.

The rollers 8 convey the ribbon of float glass to an annealing lehr in well known manner and apply tractive force to the ribbon to assist the advancing of the ribbon along the surface of the bath.

An extension 19 of the roof structure extends up to the tweel 2 to form a chamber having side walls 20 in which the spout 3 is disposed.

Molten glass, usually soda-lime-silica glass, 21 is poured on to the bath of molten metal from the spout 3. The tweel 2 regulates the rate of flow of molten glass 21 over the spout lip 4, which lip is vertically spaced from the surface 11 of the bath so that there is a free fall of molten glass from the spout to the bath surface.

The temperature of the glass as it is advanced along the bath is regulated by temperature regulators 23 mounted in the roof structure over the bath. A supply of protective gas is maintained to the headspace over the bath through ducts 24 which are provided at intervals in the roof. These ducts 24 are connected by branches 25 to a header 26 which is connected to a supply of protective gas, for example a reducing atmosphere consisting of 10% hydrogen and 90% nitrogen. The rate of supply of the reducing gas is such that a plenum of reducing atmosphere is maintained in the substantially closed headspace 27 which is defined by the roof structure over the tank structure, and there is an outlet flow of protective gas through the inlet 16 and the outlet 17.

The molten glass is delivered to the bath at a temperature which ensures that a layer 28 of molten glass is established on the bath. As this layer is advanced through the inlet 16 there is free lateral flow of the molten glass under the influence of surface tension and gravity until there is developed on the bath surface from the layer 28 a buoyant body of molten glass which is then advanced in ribbon form 29 along the bath. The width of the tank structure at the surface level of the bath is greater than the width of the buoyant body 30 of molten glass so that there is no interference with the initial free lateral flow of the molten glass.

The glass may already have a heat-absorbing characteristic due to an iron content but the composition of such a glass would not be so different from that of the customary soda-lime-silica glass to require a special thermal regime and for all usual operation the temperature at the inlet end of the bath is in the region of 1000°C and the glass is gradually cooled during its continued advance to a temperature in the region of 600°C to 650°C at which temperature the ribbon 29 is sufficiently stiffened to be taken unharmed from the bath through the outlet 17 on the conveyor rollers 18.

In carrying out the invention for modifying the upper surface of the ribbon 29 of float glass it has been found preferable to operate in a region of the bath where the glass temperature is in the range 600°C to 800°C. The upper surface of the glass is thus at a temperature at which the glass is susceptible to surface modification by migration of metal ions into the surface from a molten metal body.

In the preferred embodiment of the invention which will now be described, solar heat rejection glass having a grey/bronze colour when viewed by transmitted light, is produced by forming in the upper surface of the float glass a continuous dispersion of copper and lead of predetermined intensity.

In order to introduce a predetermined concentration of copper and lead in ionic form into the glass surface, the upper surface of the advancing ribbon of glass is contacted with a molten body 30 of copper/lead alloy which clings to a copper bar 31 which is mounted transversely of the tank structure by means of hangers 32 which are electrically conductive and are connected to an electrically conductive connection rod 33 which is fixed between the side walls of the tank structure.

The molten alloy body 30 clings to the whole underface of the copper bar and as copper becomes incorporated into the upper surface of the glass so copper from the bar 31 dissolves into the molten body 30 to maintain the equilibrium concentration of copper in the alloy body at the temperature of that body. As lead migrates into the glass surface the lead in the body is replenished either by adition through a small aperture in the copper bar 31 or by feeding on to the surface of the ribbon of glass upstream of the body for incorporation into the body in the form of small molten globules.

An electrode 34 is fixed to the tank side wall and dips into the molten metal bath through the exposed surface of the bath alongside the margins of the ribbon.

Figure 2:
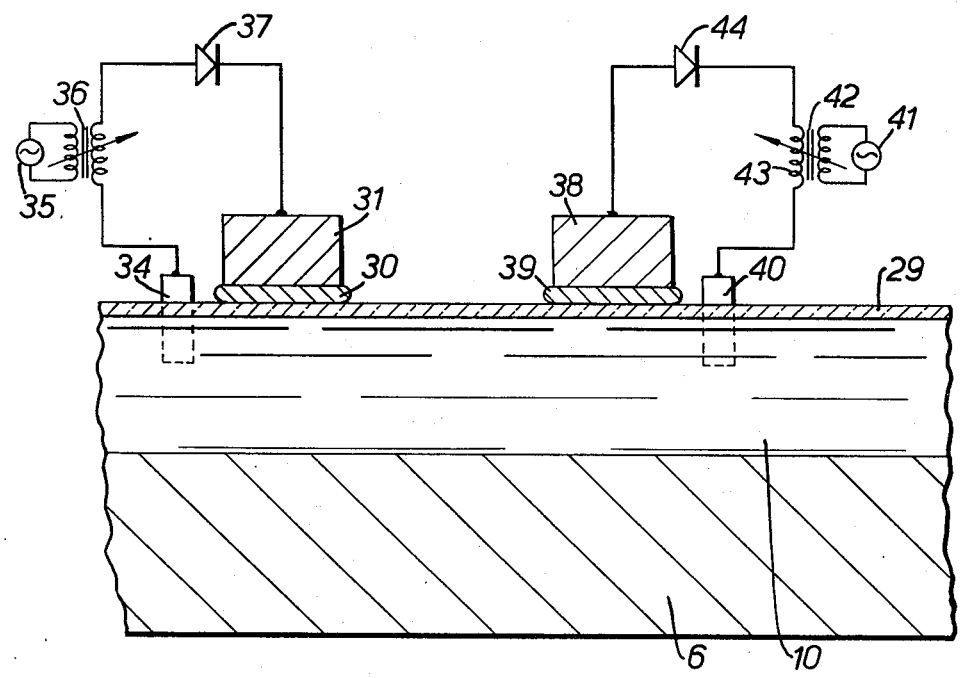
FIG. 2 is a diagrammatic view of part of FIG. 1 showing the connection of electrical supplies to the molten metal bodies.

As shown in FIG. 2 a source 35 of alternating current is connected to a supply transformer 36 one end of the secondary winding of which is connected to the electrode 34 and the other end of which winding is connected through a rectifier 37 to the copper bar 31. The sense of connection of the rectifier 37 is such that the bar 31 is in effect an anode and there is current flow from the bar 31 through the molten alloy body 30 into the upper surface of the advancing ribbon 29 of float glass and through the thickness of the glass to the underlying molten metal bath 10. Mounted at a predetermined distance downstream of the anode bar 31 is a similar copper bar 38 which is mounted just above the path of travel of the upper surface of the ribbon of glass 29 and to the whole undersurface of which there clings a second molten body of copper/lead alloy 39. Near to the copper bar 38 and alongside the path of travel of the ribbon of glass an electrode 40 dips into the molten metal of the bath. A further alternating supply 41 is connected to a second power transformer 42 whose secondary winding 43 is connected directly to the electrode 40. The other end of the secondary winding 43 is connected through a rectifier 44 to the copper bar 38. The sense of connection of the rectifier 44 is such that the copper bar 38 is cathodic with respect to the glass.

In the region between the two copper bars 31 and 38 the normal reducing atmosphere which fills the headspace over the bath is present.

In operation with the sense of electrical connection as illustrated in FIG. 2 the first molten body 30 is in effect an anodic molten metal body and the supply of current is regulated to establish an electric flux density from that anodic molten metal body 30 into the glass to cause migration of copper and lead ions into the glass surface. As a result of this initial treatment the upper surface of the glass contains a concentration of metal ions equivalent to at least two mole per cent of the oxides of the copper and lead and this predetermined concentration of metal in ionic form in the glass surface is regulated to ensure that the required metallic dispersion of predetermined intensity is developed in the glass surface by the subsequent reducing of the metal ions to elemental form.

The anodically treated glass surface emerging from beneath the molten body 30 is conveniently exposed to the reducing atmosphere consisting of for example 10% hydrogen and 90% nitrogen, and the time of exposure of the glass surface between the molten bodies 30 and 39 is set in order to provide, at the end of that time, just sufficient sodium ions in the glass surface to provide the cathodic electric flux density from the glass surface into the body 39 as will now be described.

The second body 39 which is connected as a cathode with respect to the glass is also a copper/lead alloy body and the supply circuit is regulated to establish an electric flux density from the metal ion-rich glass surface so that cathodic molten metal body 39 of value sufficient to promote cathodic reduction of sufficient of the dispersed copper and lead ions to produce the required continuous metallic dispersion in the upper surface of the glass. It has been found beneficial when working with copper and lead alloys that the electric flux density established from the glass surface to the cathodic molten body 39 should be of a value from about 10% to 50% of the anodic electric flux density from the body 30.

The anodic treatment whereby copper and lead ions enter the glass surface determines the number of reduceable cations in the glass surface which are then subject to interdiffusion with sodium ions already in the glass surface. The greater this interdiffusion the less likelihood of the introduced metal ions being extracted from the glass by the cathodic treatment beneath the body 39. The time interval between the anodic and cathodic treatments is dependent to some extent on the valency of the introduced ions and it has been found that an optimum time between the anodic and cathodic treatments exists. This optimum time is set so that the interdiffusion of metal ions and sodium ions in the glass surface is not too great and the reduceable copper and lead ions for example exist in the extreme upper surface of the glass ribbon as it advances beneath the body 39. On the other hand the time interval between the anodic and cathodic treatments is preferably such that at the end of that time as the glass surface passes beneath the body 39 the concentration of sodium ions existing in the glass surface has become sufficient to carry the current which is necessary to provide the required amount of cathodic reduction of the metal ions in the glass surface, without any appreciable migration of those metal ions from the glass into the molten body 39.

A possible explanation of the cathodic reduction mechanism is that sodium ions which migrate from the glass surface to the pool 39 are electrolytically discharged to sodium metal which then exists free in the pool 39. There is interaction between the sodium metal in the pool and lead and copper ions in the glass surface resulting in donation of electrons to the lead and copper ions. This results in reduction of the lead and copper ions to elemental metal still in the glass surface and the liberation of sodium ions. The sodium ions probably form in or enter the glass surface and prevent the newly formed lead and copper atoms in the glass from being dissolved into the pool. If there are insufficient reduceable ions in the glass surface to consume all the cathodically released sodium then that sodium in the cathodic body 39 may react with any traces of oxygen or water vapour in the protective atmosphere to give sodium oxide which may enrich the glass surface. Thus sodium ions initially present in the glass surface possibly act as a catalyst in the cathodic reduction of lead and copper ions to lead and copper atoms.

It is important therefore to regulate both the time of exposure of the glass surface between the two molten bodies 30 and 39, and the cathodic treatment of the glass surface as a percentage of the anodic treatment in cathode length in direction of ribbon travel: 7 mm,
cathode molten body temperature: 760°C,
cathode molten body composition by weight: 2.7% Cu 97.3% Pb.

Table I below illustrates nine examples of operation showing how metallic dispersions of different predetermined intensities can be produced.

Examples 1, 3 and 6 have anodic treatments only and are not according to the invention but are included for comparison purposes.

| EXAMPLE | 1 | 2 | 3 | 4 | 5 | 6 | 7 | 8 | 9 |
|---|---|---|---|---|---|---|---|---|---|
| ANODE | | | | | | | | | |
| Current (amps) | 1 | 1 | 1.5 | 1.5 | 1.5 | 2 | 2 | 2 | 2 |
| Voltage | 3 | 3 | 13 | 13 | 13 | 24 | 24 | 24 | 24 |
| Electric Flux Density (C/m²) | 310 | 310 | 465 | 465 | 465 | 620 | 620 | 620 | 620 |
| Cu/m² (mg/m²) | 68 | 68 | 112 | 112 | 112 | 116 | 116 | 116 | 116 |
| Pb/m² (mg/m²) | 222 | 222 | 317 | 317 | 317 | 473 | 473 | 473 | 473 |
| CATHODE | | 30% of anodic | | 20% of anodic | 40% of anodic | | 10% of anodic | 30% of anodic | 50% of anodic |
| Current (amps) | — | 0.3 | — | 0.3 | 0.6 | — | 0.2 | 0.6 | 1.0 |
| Voltage | — | 0.6 | — | less than 0.6 | 0.7 | — | 0.1 | 0.2 | 1.5 |
| Electric Flux Density (C/m²) | — | 93 | — | 93 | 186 | — | 62 | 186 | 310 |
| Final Cu/m² (mg/m²) | 68 | 68 | 112 | 112 | 112 | 116 | 116 | 116 | 116 |
| Final Pb/m² (mg/m²) | 222 | 222 | 317 | 262 | 208 | 473 | 462 | 386 | 386 |
| Visible Light Transmission % | 53 | 40 | 44 | 37 | 31 | 38 | 33 | 28 | 20 |
| Visible Light Reflection % | 11 | 20 | 14 | 16 | 24 | 10 | 18 | 18 | 29 |
| Solar Radiation Reflection % | 13 | 20 | 14 | 16 | 24 | 12 | 17 | 19 | 32 |
| Solar Radiation Absorption % | 35 | 36 | 36 | 41 | 39 | 42 | 40 | 42 | 44 |
| Solar Radiation Direct Transmission % | 52 | 44 | 50 | 43 | 37 | 46 | 43 | 39 | 24 |
| COLOUR Transmitted Light | bronze | bronze | grey/ bronze | grey/ bronze | grey/ bronze | grey | grey | grey | grey |
| Reflected Light | yellow specular | neutral specular | slightly diffuse | blue specular | neutral specular | strongly diffuse | neutral specular | neutral specular | neutral specular | order to produce optimum results. Some examples will now be given illustrating the production of glasses on a pilot plant scale having different optical characteristics using the copper/lead system. That is both the anode bar 31 and the cathode bar 38 are of copper and both the molten bodies 30 and 39 are of copper/lead alloy.

The glass produced can have a copper/lead dispersion developed in a surface layer at most 0.1 microns thick and consisting of from 25 to 300 mg/m² of copper and from 100 to 60 mg/m² of lead.

The composition of the glass, which is a soda-lime-silica glass is as follows, in mole per cent:-

| | |
|---|---|
| $Na_2O$ | 12.4% |
| $K_2O$ | 0.4% |
| $SiO_2$ | 71.8% |
| CaO | 8.8% |
| MgO | 5.6 |
| $Al_2O_3$, $Fe_2O_3$, etc. | 1.0%. |

The general conditions of operation are as follows:-
ribbon speed: 46 metres per hour,
ribbon width: 30 cm
anode length in direction of ribbon travel: 7 mm,
anode width: 24 cm
glass temperature at anode: 790°C,
anode molten body temperature: 780°C,
anode molten body composition by weight: 3% Cu 97% Pb,
anode/cathode interval: 1 second (13 mm)

In this table the electric flux densities are expressed in terms of coulombs per square meter (C/m²) of the glass. Also the amounts of metal in the glass are expressed as in terms of milligrams per square meter (mg/m²) of the glass.

Examples 1 and 2 are related in that the same anodic treatment is employed giving 68 mg/m² of copper and 222 mg/m² of lead in the upper surface of the ribbon emerging from beneath the body 30.

In Example 1 no cathodic reduction treatment is applied and the copper and lead atoms dispersed in the upper surface of the eventual ribbon of glass are produced by the influence of the reducing atmosphere on the upper surface of the glass. The resulting glass is bronze to transmitted light and has a solar radiation direct transmission of 52% and a visible light transmission of 53%.

Example 2 illustrates how when applying a cathodic reduction treatment according to the invention the solar radiation direct transmission is reduced to 44% while retaining the bronze colour in transmitted light but with a fall of visible light transmission to 40%. The cathodic treatment applied is 30% of the anodic treatment. The concentrations of copper and lead in the reduced glass surface remain the same as those introduced by the anodic treatment but it will be seen that the reduction is more effective so that the glass produced has better solar heat rejection characteristics.

In Examples 3 to 5 the glass is subjected to the same anodic treatment. There is a higher anodic treatment than in Examples 1 and 2 resulting in increased concentrations, at least initially, of both copper and lead ions in the glass surface. In Example 3 where there is no cathodic reduction the visible light transmission is 44% and the solar radiation direct transmission about 50%.

In Example 4 the anodically treated glass is subjected to a cathodic reduction of about 20% giving a fall to about 43% in solar radiation direct transmission with a commensurate fall to 37% of the visible light transmission. The amount of copper in the glass remains the same as that introduced anodically, but some lead has been caused to migrate from the glass surface into the pool 38. With the cathodic treatment being 40% of the anodic treatment in Example 5, even more lead has been lost into the body 39 even though there is a further fall of the solar radiation direct transmission to about 37% and a further loss of visible light transmission to 31%.

Examples 6 to 9 show the same pattern with an even stronger anodic treatment and with cathodic reduction treatments of 10%, 30% and 50% of the anodic treatment.

All the results given in Table I are with a fixed anode cathode gap of 13 mm corresponding to a time of travel of 1 second at the ribbon speed of 46 metres per hour. With the anode cathode gap fixed the examples show how variation of the cathodic reduction treatment as a percentage of from 10% to 50% of the anodic treatment gives a required metallic dispersion in the glass surface which is expressed in terms of the optical characteristics of the glass. The effect of variation of the anode/cathode gap was also investigated using the same system of a copper anode bar 31 and a copper cathode bar 38 with the alloy bodies 30 and 31 being of copper/lead alloy and with glass 7 mm thick advancing at a ribbon speed of 46 metres per hour. The protective atmosphere in the headspace over the bath consisted of 10% hydrogen and 90% nitrogen. The same glass composition was used as in Examples 1 to 9 and some other operating conditions were the same as follows:

ribbon speed: 46 metres per hour,
ribbon width: 30 cm,
anode length: 7 mm,
anode width: 25 cm,
glass temperature at anode: 790°C,
anode molten body temperature: 780°C,
anode molten body composition by weight: 3% Cu 97% Pb,
cathode length: 7 mm,
cathode molten body temperature: 760°C,
cathode molten body composition: 2.7% Cu 97.3% Pb.

The anodic treatment was specified as follows:
anode current: 1.5 amps,
anode voltage: 13 volts,
anode electric flux density: 465 C/m$^2$,
Cu in glass surface: 112 mg/m$^2$,
Pb in glass surface: 317 mg/m$^2$. The cathodic treatment then applied was 40% of the anodic treatment as follows:
cathode current: 0.6 amps,
cathode voltage: below 2.0 volts,
cathode electric flux density: 186 C/m$^2$.

The final characteristics of the glass are set out in Table II.

TABLE II

| EXAMPLE | 10 | 11 | 12 | 13 |
|---|---|---|---|---|
| Anode-Cathode Gap | 0.5 sec (6 mm) | 1.0 sec (13 mm) | 2.0 sec (25 mm) | 4.0 sec (50 mm) |
| Visible Light Transmission % | 47 | 31 | 33 | 38 |
| Visible Light Reflection % | 11 | 24 | 13 | 7 |
| Solar Radiation Reflection % | 11 | 24 | 13 | 7 |
| Solar Radiation Absorption % | 38 | 39 | 43 | 46 |
| Solar Radiation Direct Transmission % | 51 | 37 | 44 | 47 |
| Final Cu/m$^2$ (mg/m$^2$) | 112 | 112 | 112 | 112 |
| Final Pb/m$^2$ (mg/m$^2$) | 175 | 208 | 317 | 317 |

Under these conditions it was determined that the optimum gap between the downstream edge of the anodic body 30 and the upstream edge of the cathodic body 39 is about 1.0 second at 780°C under the given conditions as set out above. Table II indicates a 45% loss of lead from the glass surface into the cathodic body 39 with a 0.5 second gap. There was a 34% loss of lead with a 1.0 second gap and no loss of lead with 2.0 and 4.0 second gaps. This indicates an optimum gap of say 1 to 1.5 seconds. The longer anode-cathode gaps (2.0 and 4.0 seconds) yielded higher visible light transmissions and lower visible light reflections than the optimum gap of 1.0 to 1.5 seconds. It was determined from these results that as the anode-cathode gap increases beyond the optimum the cathodic treatment becomes less and less effective and development of colour in the glass becomes principally due to hydrogen reduction.

Possibly the operation at the optimum anode/cathode gap as already described results in the reduceable ion concentration in the extreme surface of the glass being as high as possible as the glass moves beneath the cathodic pool 39 consistent with the concentration of sodium ions in the glass surface being sufficient to carry the required cathodic current without a significant loss of metal ions into the cathodic pool.

Further experiments have shown that the optimum anode-cathode gap for a given anodic and cathodic treatment, approximately doubles for every 50°C fall in operating temperature. This is probably due to influence of temperature on the rate of interdiffusion of sodium and copper ions and of sodium and lead ions.

The influence of temperature and ribbon speed on the optimum anode/cathode gap is illustrated in Table III which gives results produced under production conditions using molten bodies of copper/lead alloy to produce a product having characteristics similar to those of the glass of Example 5 in Table I.

TABLE III

| Glass Thickness (mm) | Ribbon Speed meters/hour | Glass Temperature °C | Anode/Cathode Gap |
|---|---|---|---|
| 3 | 720 | 780 | 1 sec (20 cm) |
| 6 | 360 | 730 | 2 sec (20 cm) |
| 12 | 180 | 680 | 4 sec (20 cm) |

These results show that the time taken by the ribbon to travel between the anode and the cathode doubles for each 50°C fall in temperature. However in this table the glass thickness doubles and the length of the anode/cathode gap remains the same (200 mm). This also indicates that a range of glass thicknesses can receive the same treatment with the anode/cathode spacing fixed, by varying the ribbon speed and the glass temperature.

While it is preferred to operate with an optimum anode-cathode gap, nevertheless useful products have been made at non-optimum spacings between the anodes and cathodes.

The examples of operation with a copper/lead alloy just described can be summarised as the production of surface modified glass wherein the copper/lead dispersion in a surface layer of thickness at most 0.1 microns consists of from 65 to 120 mg/m² of copper and from 175 to 470 mg/m² of lead. The solar radiation direct transmission of the glass is in the range 35% to 55%.

In another example of operation according to the invention the upper surface of the ribbon of float glass is modified by the entry of copper ions into the upper surface of the ribbon for subsequent reduction therein to metallic form. In this way of operating the invention the atmosphere in the headspace over the bath was 100% nitrogen. Glass of the same composition as set out above and 7 mm thick was employed. Both the anode bar 31 and the cathode bar 38 were of copper and the two molten bodies 30 and 39 were of copper/bismuth alloy. Other general operating conditions were as follows:

ribbon speed: 46 meters per hour,
ribbon width: 30 cm,
anode length in direction of ribbon travel: 7 mm,
anode width: 15 cm,
glass temperature at anode: 750°C,
anode molten body temperature: 740°C,
anode molten body composition by weight: 10% copper 90% bismuth,
anode-cathode gap: 0.5 seconds (6 mm),
cathode length in direction of ribbon travel: 7 mm,
cathode molten body temperature: 730°C,
cathode molten body composition by weight: 9.7% copper, 91.3% bismuth. Two examples of treatment of glass are given below in Table IV. Example 14 has no cathodic treatment and is given for comparison with Example 15 which has a cathodic reduction step according to the invention. The anodic treatment is identical in these Examples.

TABLE IV

| Example | 14 | 15 |
|---|---|---|
| ANODE | | |
| Current (amps) | 1.5 | 1.5 |
| Voltage | 6.6 | 6.6 |
| Electric Flux | | |
| Density C/m² | 800 | 800 |
| Cu/m² (mg/m²) | 515 | 515 |
| Bi/m² (mg/m²) | 11 | 11 |
| CATHODE | | 27% of anodic |
| Current (amps) | — | 0.4 |
| Voltage | — | 1.1 |
| Electric Flux Density C/m² | — | 215 |
| Final Cu/m² (mg/m²) | 515 | 515 |
| Final Bi/m² (mg/m²) | 11 | 11 |
| Visible Light Transmission % | 71 | 9 |
| Visible Light Reflection % | 7 | 46 |
| Solar Radiation Reflection % | 7 | 44 |
| Solar Radiation Absorption % | 25 | 37 |
| Solar Radiation Direct Transmission % | 68 | 19 |
| COLOUR | | |
| Transmitted Light | pale pink | blue |
| Reflected Light | | coppery |

In Example 15 the cathodic reduction treatment which is 27% of the anodic treatment does not diminish the concentrations of copper and bismuth in the glass surface but results in a massive reduction in the visible light transmission from 71% to 9% and a reduction in solar radiation direct transmission from about 68% to 19%. A cathodic reduction treatment of from 25% to 30% of the anodic treatment could be employed.

The very small proportion of bismuth present in the glass as compared with that of copper means that this is in effect a copper-only treatment. The anode-cathode gap of 0.5 seconds (7 mm) was found to be an optimum gap under the operating conditions. It has been found that the copper/bismuth dispersion developed in a surface layer of the glass at most 0.1 microns thick by this method may consist of from 50 to 600 mg/m² of copper and from 5 to 25 mg/m² of bismuth.

The method of the invention has also been employed with other chemical systems for example with the anode bar 31 and the cathode bar made of nickel and with the molten bodies 30 and 39 being of nickel/bismuth alloy. Under operating conditions similar to those described above it was found that the cathodic reduction of nickel and bismuth in the glass resulted in a grey glass having a nickel/bismuth dispersion in a 0.1 microns thick surface layer consisting of from 25 to 500 mg/m² of nickel and from 5 to 100 mg/m² of bismuth, and having a visible light transmission of 40% and a solar radiation direct transmission of 42% for example.

Again with anode and cathode bars of nickel, molten bodies of tin/nickel alloy were used giving a glass with a brownish tint due to presence in a 0.1 microns thick surface layer of from 25 to 500 mg/m² of tin and from 1 to 25 mg/m² of nickel. The glass has for example a visible light transmission of 46% and a solar radiation direct transmission of 50%.

With anode and cathode bars of nickel, molten bodies of lead/nickel alloy were used giving glasses with grey transmission tints and visible light and solar heat reflections of up to 35%, due to the presence in a 0.1 microns thick surface layer of the glass of from 50 to 800 mg/m² of lead and from 5 to 100 mg/m² of nickel.

With anode and cathode bars of ruthenium, or of steel coated with ruthenium by spraying, molten bodies of pure lead can be used so as to give a dispersion of about 50 to 800 mg/m² of lead in a 0.1 microns thick surface layer of the glass. When using pure lead molten bodies the optimum anode/cathode gap at a glass temperature of about 780°C may be of the order of 5 seconds, that is about 6 cm at a ribbon speed of 46 metres per hour, which is a relatively large gap when compared with the optimum gap for copper/lead alloy bodies indicated above. The provision of such relatively large gap can be of practical advantage and convenience. Further, with pure lead bodies, and also with copper/lead alloy bodies, a relatively low level of cathodic treatment, e.g., 10% or less of the anodic treatment, can produce satisfactory products not displaying undesirable turbidity or diffuse reflection characteristics, although higher levels of cathodic treatment, e.g., up to about 50% of the anodic treatment, may be employed if desired.

The method of the invention thus provides enhanced optical properties in glass produced by an electrolytic treatment method, particularly float glass when so modified. The production with a high degree of reproduceability of a uniform continuous metallic dispersion of predetermined intensity in the glass surface gives an improved solar heat rejection glass where the dispersed metal is in the form of large particles (or platelets) in the glass surface which is the principal factor in the enhanced solar heat rejection characteristics.

We claim:

1. In a glass manufacturing method in which a metallic dispersion of predetermined intensity is developed in a surface of the glass whose composition includes alkali-metal oxide, which glass is at a temperature at which the glass is susceptible to surface modification by reduction of metal ions introduced into the glass surface in a predetermined concentration by electrolytic migration caused by an electric flux density established from a first molten metal body which is anodic with respect to the glass, the improvement comprising:

at a preset time after completion of said electrolytic migration, at which time there are sufficient alkali-metal ions in the glass surface to provide a subsequent cathodic electric flux density from the glass surface to a second molten metal body, contacting that glass surface with said second molten metal body which is cathodic with respect to the glass and is sufficiently reducing with respect to said metal ions in said glass surface to reduce said metal ions in said ion-rich surface to metallic form, and establishing, while maintaining that contact, said cathodic electric flux density from the glass surface to said second molten metal body which is sufficient to effect such reduction to metallic form of said metal ions in said ion-rich surface as produces in said glass surface said metallic dispersion of predetermined intensity.

2. A method according to claim 1 wherein both said first and second molten metal bodies are bodies of copper/lead alloy, an electric flux density is established from the glass surface to the second molten body of copper/lead alloy of value from about 10 percent to 50 percent of the anodic electric flux density and sufficient to promote cathodic reduction of sufficient of the copper and lead ions in the glass surface to produce the required metallic dispersion in the glass surface.

3. A method according to claim 1, wherein both said first and second molten metal bodies are of copper/bismuth alloy, an inert atmosphere is maintained over the glass surface, an electric flux density is established from the glass surface to the second molten body of copper/bismuth alloy of value from about 25 percent to 30 percent of the anodic electric flux density and sufficient to promote cathodic reduction of sufficient of the copper ions in the glass to produce the required metallic dispersion in the glass surface.

4. A method according to claim 1, wherein both said first and second molten metal bodies are of lead, and an electric flux density is established from the glass surface to the second molten body of lead of value from about 10 percent to 50 percent of the anodic electric flux density and sufficient to promote cathodic reduction of sufficient of the lead ions in the glass surface to produce the required metallic dispersion in the glass surface.

5. A method of manufacturing soda-lime-silica glass having a metallic dispersion of predetermined intensity developed in a surface thereof, comprising advancing the glass in ribbon form along a bath of molten metal, maintaining the glass at a temperature at which it susceptible to surface modification, contacting the glass at that temperature with a first molten metal body, connecting said first molten metal body as an anode with respect to the glass, establishing an anodic electric flux density from said first molten metal body into the glass surface to cause sufficient electrolytic migration of reducible metal ions into the glass surface to render said glass surface rich in said reducible metal ions, then after a preset time interval contacting the glass with a second molten metal body which is reducing with respect to the reducible metal ions in the glass, connecting said second molten metal body as a cathode with respect to the glass, establishing a cathodic electric flux density from the reducible metal ion-rich glass surface to that second molten metal body, setting said cathodic electric flux density to a value to promote cathodic reduction of sufficient of said reducible metal ions in the ion-rich glass surface to produce the required metallic dispersion in said glass surface in the time of maintenance of contact between said second molten metal body and the glass surface, and presetting the time interval of exposure of the advancing ion-rich glass surface between said first and second molten metal bodies to provide at the end of said exposure time a sodium ion concentration in the glass surface sufficient to provide said cathodic electric flux density and to avoid significant migration of said reducible metal ions from the glass into said second molten metal body.

6. In a glass manufacturing method in which a metallic dispersion of predetermined intensity is developed in a surface of the glass whose composition includes alkali-metal oxide, which glass is at a temperature at which the glass is susceptible to surface modification by reduction of metal ions introduced in a predetermined concentration into the glass surface by electrolytic migration caused by an anodic electric flux density established into the glass surface, the improvement comprising:

at a preset time after completion of said electrolytic migration, at which time the glass surface is rich in reducible metal ions and there are sufficient alkali-metal ions in the glass surface to provide a subsequent cathodic electric flux density from the glass surface without significant migration of said reducible metal ions from the glass, establishing a cathodic electric flux density from the ion-rich glass surface to a molten metal body contacting the ion-rich glass surface, which molten metal body is sufficiently reducing with respect to said metal ions in said glass surface to reduce said metal ions in said ion-rich surface to metallic form, and which cathodic electric flux density is maintained for a sufficient time to effect such reduction to metallic form of said metal ions in said ion-rich surface as produces in said glass surface said metallic dispersion of predetermined intensity.

7. In a glass manufacturing method in which a metallic dispersion of predetermined intensity is developed in a surface of the glass which is at a temperature at which the glass is susceptible to surface modification by reduction of metal ions introduced in a predetermined concentration into the glass surface by electrolytic migration caused by an anodic electric flux density established into the glass surface, the improvement comprising:

at a preset time after completion of said electrolytic migration, at which time the glass surface is rich in reducible metal ions and there are sufficient alkali ions ijn the glass surface to provide a subsequent cathodic electric flux density from the glass surface without significant migration of said reducible metal ions from the glass, cathodically contacting that glass surface in an ion-rich condition with a molten metal body which is sufficiently reducing with respect to said metal ions to reduce said metal ions in said ion-rich surface to metallic form, and maintaining a cathodic electric flux density of alkali ions from the glass surface to the molten metal body for a time sufficient to effect such reduction to metallic form of said metal ions in said ion-rich surface as produces in said glass surface said metallic dispersion of predetermined intensity.

8. In a glass manufacturing method in which a copper/lead dispersion of predetermined intensity is developed in a surface of soda-lime-silica glass which glass is at a temperature at which the glass is susceptible to surface modification by reduction of copper and lead ions introduced into the glass surface in a predetermined concentration by electrolytic migration caused by an electric flux density established from a first molten body of copper/lead alloy which is anodic with respect to the glass, the improvement comprising:

at a time in the range 1 to 4 seconds after completion of said electrolytic migration at which time there are sufficient sodium ions in the glass surface to provide a subsequent cathodic electric flux density from the glass surface to a second molten body of copper/lead alloy, contacting that glass surface with said second molten body of copper/lead alloy which is cathodic with respect to the glass and is sufficiently reducing with respect to said metal ions in said glass surface to reduce said metal ions in said ion-rich surface to metallic form, and establishing, while maintaining that contact, from the glass to said second molten alloy body said cathodic electric flux density which is from about 10 percent to 50 percent of the anodic electric flux density and reduces sufficient copper and lead ions in the glass surface to produce from 25 to 300 mg/m$^2$ of copper and from 100 to 600 mg/m$^2$ of lead in a surface layer of the glass at most 0.1 microns thick.

9. A method according to claim 8 wherein said time between contact of the glass by said first and second molten alloy bodies is from 1 to 2 seconds.

10. A method of manufacturing float glass of soda-lime-silica composition having a copper/lead dispersion in one surface thereof comprising:

advancing the glass in ribbon form along a bath of molten metal while maintaining the glass at a temperature at which it is susceptible to surface modification;

contacting the upper surface of the ribbon of glass at that temperature with a first molten body of copper/lead alloy;

connecting said first molten copper/lead alloy body as an anode with respect to the glass and establishing an anodic electric flux density of from 310 to 620 coulombs per square meter from said first body into the upper surface of the ribbon to cause electrolytic migration of copper and lead ions into the glass surface;

then after a time of from 1 to 4 seconds after the ribbon surface emerges from beneath said first molten alloy body, contacting the ribbon surface with a second molten copper/lead alloy body;

connecting said second molten copper/lead alloy body as a cathode with respect to the glass and establishing a cathodic electric flux density of from 93 to 310 coulombs per square meter from the upper surface of the ribbon into said second body which reduces sufficient copper and lead ions in the glass surface to provide from 68 to 116 mg/m$^2$ of copper and from 100 to 600 mg/m$^2$ of lead in a surface layer of the glass at most 0.1 microns thick.

11. In a glass manufacturing method in which a copper/bismuth dispersion of predetermined intensity is developed in a surface of soda-lime-silica glass over which an inert atmosphere is maintained, which glass is at a temperature at which the glass is susceptible to surface modification by reduction of copper and bismuth ions introduced into the glass surface in a predetermined concentration by electrolytic migration caused by an electric flux density established from a first body of copper/bismuth alloy which is anodic with respect to the glass, the improvement comprising:

at a time of the order of 0.5 seconds after completion of said electrolytic migration at which time there are sufficient sodium ions in the glass surface to provide a subsequent cathodic electric flux density from the glass surface to a second molten body of copper/bismuth alloy and is sufficiently reducing with respect to said metal ions in said glass surface to reduce said metal ions in said ion-rich surface to metallic form, contacting that glass surface with said second molten body fo copper/bismuth alloy which is cathodic with respect to the glass, and establishing, while maintaining that contact, from the glass to said second molten alloy body said cathodic electric flux density which is from about 25 percent to 30 percent of the anodic electric flux density and reduces sufficient copper and bismuth ions in the glass surface to provide from 50 to 600 mg/m$^2$ of copper and from 5 to 25 mg/m$^2$ of bismuth in a surface layer of the glass at most 0.1 microns thick.

12. A method of manufacturing float glass of soda-lime-silica composition having a copper/bismuth dispersion in one surface thereof comprising:

advancing the glass in ribbon form along a bath of molten metal over which an inert atmosphere is maintained while maintaining the glass at a temperature at which it is susceptible to surface modification;

contacting the upper surface of the ribbon of glass at that temperature with a first molten body of copper/bismuth alloy;

connecting said first molten copper/bismuth alloy body as an anode with respect to the glass and establishing an anodic electric flux density of 800 coulombs per square meter from said first body into the upper surface of the ribbon to cause electrolytic migration of copper and bismuth ions into the glass surface;

then after a time of the order of 0.5 seconds after the ribbon surface emerges from beneath said first molten alloy body, contacting the ribbon surface with a second molten copper/bismuth alloy body;

connecting said second molten copper/bismuth alloy body as a cathode with respect to the glass and establishing a cathodic electric flux density of 515 coulombs per square meter from the upper surface of the ribbon into said second body and sufficient to provide by reduction 515 mg/m$^2$ of copper and 11 mg/m$^2$ of lead in a surface layer of the glass at most 0.1 microns thick.

* * * * *